United States Patent
Esposito et al.

(10) Patent No.: US 9,016,754 B2
(45) Date of Patent: Apr. 28, 2015

(54) AGRICULTURAL WORK VEHICLE

(71) Applicant: Argo Tractors S.p.A., Fabbrico (Reggio Emilia) (IT)

(72) Inventors: Giovanni Esposito, Vimercate (IT); Andrea Magnanini, Fabbrico (IT); Massimiliano Del Bue, Modena (IT)

(73) Assignee: Argo Tractors S.p.A., Fabbrico (RE) (IT)

( * ) Notice: Subject to any disclaimer, the term of this patent is extended or adjusted under 35 U.S.C. 154(b) by 0 days.

(21) Appl. No.: 14/184,385

(22) Filed: Feb. 19, 2014

(65) Prior Publication Data
US 2014/0232139 A1 Aug. 21, 2014

(30) Foreign Application Priority Data

Feb. 21, 2013 (IT) ............... RE2013A0010

(51) Int. Cl.
*B60N 2/38* (2006.01)
*B62D 33/06* (2006.01)
*B60N 2/48* (2006.01)

(52) U.S. Cl.
CPC .............. B60N 2/38 (2013.01); B62D 33/0617 (2013.01); *B60N 2/4808* (2013.01)

(58) Field of Classification Search
CPC ............................. B60N 2/38; B62D 33/0617
USPC ........ 296/64, 66, 68, 65.09, 37.8, 63, 190.08; 297/14

See application file for complete search history.

(56) References Cited

U.S. PATENT DOCUMENTS

| 954,222 A | 4/1910 | Stow |
| 1,323,693 A | 12/1919 | Henderson |
| 1,698,036 A * | 1/1929 | Trammell ...................... 297/14 |
| 4,527,828 A * | 7/1985 | Groce et al. ............... 296/65.09 |
| 4,580,832 A * | 4/1986 | Maruyama et al. ............. 297/14 |
| 5,533,774 A * | 7/1996 | Cavanaugh ..................... 296/66 |
| 5,797,649 A * | 8/1998 | Snell et al. ..................... 297/14 |
| 2009/0302632 A1 | 12/2009 | Kuno et al. |
| 2013/0341952 A1* | 12/2013 | Mather et al. .................. 296/64 |

FOREIGN PATENT DOCUMENTS

| EP | 0430905 A1 | 6/1991 |
| EP | 0842812 A2 | 5/1995 |
| EP | 0842812 A2 | 5/1998 |
| FR | 2724608 A1 | 3/1996 |
| GB | 2140283 A | 11/1984 |
| WO | 2008093197 A1 | 8/2008 |
| WO | 2011009643 A1 | 1/2011 |

* cited by examiner

*Primary Examiner* — Jason S Morrow
(74) *Attorney, Agent, or Firm* — Vople and Koenig, P.C.

(57) ABSTRACT

An embodiment of the present invention discloses an agricultural work vehicle comprising a cabin and at least a cladding element (105) for delimiting an internal space of the cabin, in which the cladding element (105) comprises an opening (135) able to place the internal space of the cabin in communication with a compartment (140) in which at least a seat (205) is housed, the seat (205) being mobile with respect to the cladding element (105) between a rest position, in which it is completely contained in the compartment (140), and a use position, in which it is horizontally orientated and projects at least partially into the internal space of the cabin.

7 Claims, 7 Drawing Sheets

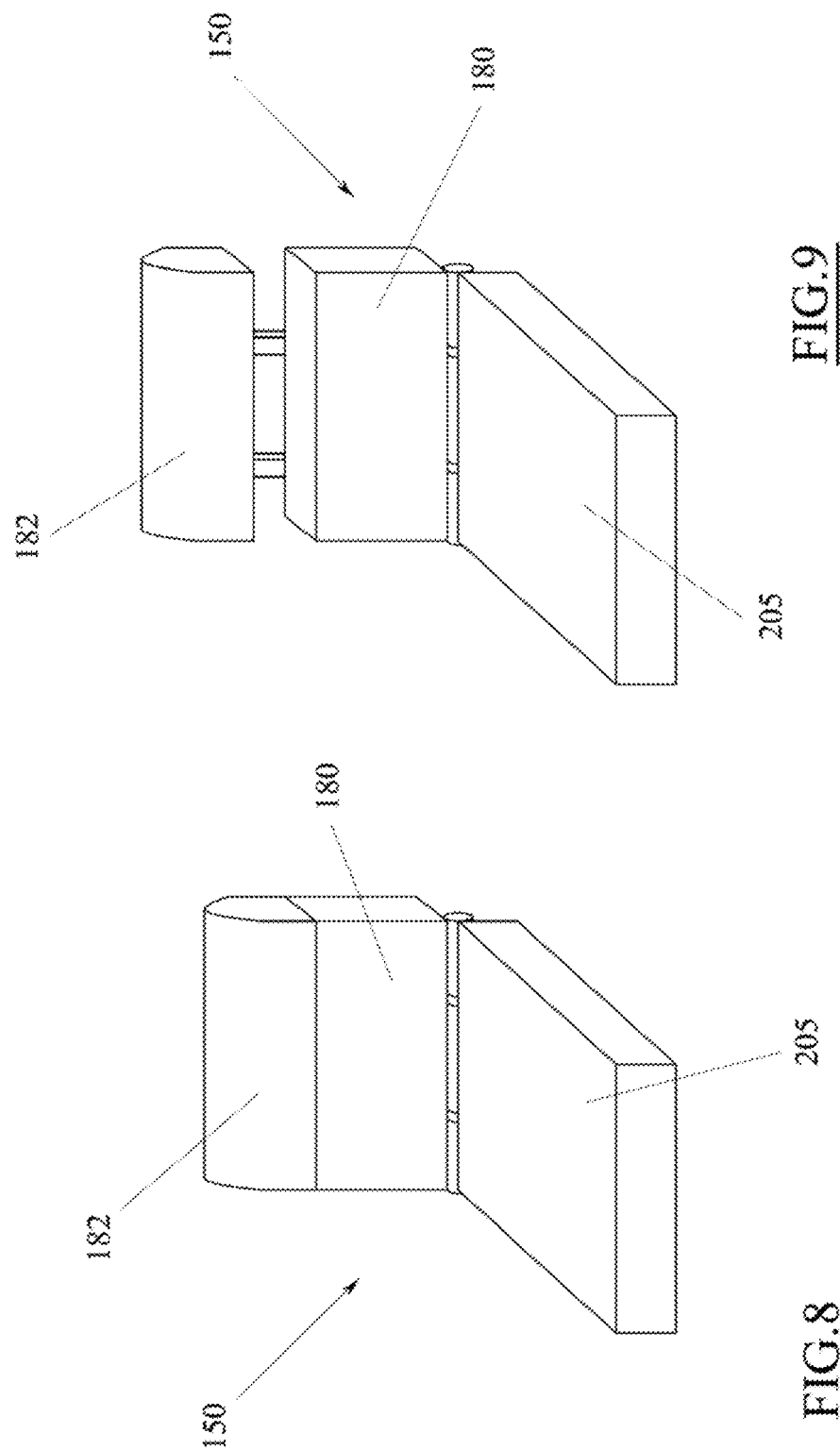

AGRICULTURAL WORK VEHICLE

FIELD OF THE INVENTION

The present invention relates to agricultural tractors and more in general to agricultural work vehicles, i.e. self-propelling machines able to carry out agricultural work driven by an on-board driver.

BACKGROUND

As is known, agricultural tractors generally comprise a cabin positioned between the wheels of the rear axle, internally of which a main seat is installed, which can be occupied by the driver controlling and guiding the tractor. In economical models, the cabin can be completely open and possibly equipped with only a roll-bar to protect the driver in a case of overturning. In more sophisticated models, the cabin can instead be made in the form of a true and proper cabin, which generally comprises a cover and a series of transparent lateral panels which enable the driver to have a complete view of the surrounding environment.

Especially when the driver position is a cabin, the internal space of the cockpit is typically also delimited by a series of cladding elements borrowed from the automobile sector, which can integrate the various commands of the agricultural tractor and are able to cover the in-view parts of the chassis or other mechanical structures, so as to improve the aesthetic appeal of the cabin as well as the driver's comfort.

These cladding elements are generally suitably-shaped casings which can be made of a plastic material, for example by hot-forming, and therefore conveniently fixed to the various parts to be covered.

In particular, the cladding elements normally include at least a front dashboard covering the part of the frame that separates the cabin from the engine compartment, and two lateral panels having a substantially arched shape, which are located on opposite sides with respect to the driver's seat and are singly able to cover a respective wheel well, connecting with the external mudguard.

The front portion of at least one of the lateral panels is normally separated and distanced from the front dashboard, so as to leave a strict access corridor which enables the driver to climb into and out of the cabin.

Often associated to the front portion of the lateral panel is an auxiliary seat, which is located internally of the cabin and is destined to be used by a passenger who might need a ride on the agricultural tractor. This auxiliary seat is often completed by a backrest which is located in a substantially vertical or slightly inclined position to the wall of the lateral panel.

Owing to its location, the auxiliary seat is a considerable encumbrance to the access corridor to the cabin, obstructing the driver's and passenger's access to and from the cabin. For this reason, the auxiliary seat is normally reclinable upwards or downwards between a use position, in which it is substantially horizontal and projects from the wall of the panel, and a rest position in which it is arranged substantially vertically and parallel to the backrest, at least partially freeing the access corridor to the cabin.

In the rest position too, the auxiliary seat and the backrest create a certain obstruction, which adds to the encumbrance of the lateral panel and therefore reduces the dimensions of the access corridor and, more generally, the cabin.

As the space available internally of the cabin of agricultural tractors is in itself very restricted, due to the number of structural constraints relating to the type of vehicle, it follows that this extra encumbrance, however modest, constitutes a further significant limitation to the comfort and overall ergonomics of the driver's position as well as a limitation to safety considerations, as it obstructs escape in case of emergency.

A further significant limitation of these auxiliary seats consists in the fact that they are always visible on the lateral panel, thus harming the aesthetic appeal of the cabin.

An aim of the present invention is therefore to provide a solution enabling obviating the limits of the known auxiliary seats, improving the exploitation of the spaces in order to improve comfort, ergonomics and aesthetic appeal of the cabins of agricultural tractors. A further aim is to attain the above-mentioned objective with a solution that is simple, rational and relatively inexpensive.

These and other aims are attained with the characteristics of the invention as set out in the claims.

SUMMARY

In particular, an embodiment of the present invention discloses an agricultural work vehicle comprising a cabin and at least a cladding element for delimiting an internal space of the cabin, in which the cladding element comprises an opening able to place the internal space of the cabin in communication with a compartment in which at least a seat is housed, the seat being mobile with respect to the cladding element between a rest position, in which it is completely contained in the compartment, and a use position, in which it is horizontally (or virtually horizontally) orientated and projects at least partially into the internal space of the cabin.

Thanks to this solution, the seat, in the work position, can be advantageously used to transport a passenger, while in the rest position the seat is completely contained within the volume of the cladding element (for example and preferably in the lateral panel), without occupying space internally of the cabin.

In this way the available space in the cabin also intrinsically increases safety, as the seat does not obstruct rapid exit in case of emergency.

In an aspect of the invention, a lid is fixed to the seat, which lid is able to close the opening of the cladding element when the seat is in the rest position.

This solution has the advantage of improving the aesthetic appeal of the cabin, as the seat in the rest position is completely hidden by the lid, which in turn can be profiled so as to connect continuously with the shape of the cladding element, creating an effect of total or near-total concealing of the seat.

In a further aspect of the invention, compartment in which the seat is housed is delimited by a bin which branches from the opening of the cladding element.

In this way, in the rest position the seat is advantageously protected in the cavity of the bin, which further has the advantage of preventing the structural parts normally covered by the cladding element from being visible when the seat is in the use position.

The bin can be realized as a separate body with respect to the cladding element and be subsequently inserted in the opening of the cladding element, where it can be fixed by hot-welding, gluing or other known systems. Alternatively, the bin can be formed in a single body with the cladding element. In this case, the above-mentioned opening of the cladding element is in fact defined by the edge of the bin.

In a further aspect of the invention an elastically yielding element is included, able to push the seat towards the rest position. By way of example, this elastic element can be any type of spring, including a gas spring or other pneumatic devices and/or like hydraulic devices.

In this way, when the seat is in the rest position, the elastically-acting element can advantageously ensure that the seat does not impact against the cladding element, for example following vibrations or jolts to which the tractor is normally subjected during agricultural work, resulting in noise and in any case transmitting a sense of poor quality.

With the aim of not contributing additional clutter, and not compromising the aesthetic appeal of the cladding element, the elastically-acting element can be configured so as to be completely contained in the compartment, at least when the seat is in the rest position.

In a further aspect of the invention, the compartment can also include a backrest for the seat, which backrest is in turn mobile with respect to the cladding element between a rest position, in which it is completely contained in the compartment, and a use position, in which it is orientated vertically (or nearly vertically) and projects at least partially into the internal space of the cabin.

With this solution, in the use position the backrest enables the passenger to rest his or her back, improving the comfort and ergonomic advantages of the seat, while in the rest position, the backrest is completely contained, together with the seat, within the volume of the cladding element and thus does not occupy space internally of the cabin.

In an aspect of this solution, the seat and the backrest can be reciprocally mobile between a closed configuration, in which they are substantially parallel and superposed, and an open configuration, in which they are substantially at a right angle.

With this solution, when the seat and the backrest are brought into the use position, they take on the above-mentioned open configuration, so as to perform the function of providing a rest for the passenger. When on the other hand the seat and the backrest are brought into the rest position, they take on the above-mentioned closed configuration, so as to significantly reduce the overall encumbrance thereof. This means that the compartment where the seat and the backrest are housed can advantageously be realized in quite modest dimensions, enabling a further optimization of the spaces in the cabin.

A further aspect of this solution relates to means for regulating a distance of the backrest from the seat when both are in use position.

In this way, the passenger can, if desired, regulate the height of the backrest so as to make it more comfortable and ergonomic.

Passing on to aspects in greater detail, in the invention the seat can be mobile with respect to the cladding element using first hinge means which enable the seat to rotate about a substantially horizontal axis.

This aspect has the advantage of configuring a very simple solution for enabling the seat to be displaced between the use position and the rest position.

In a further aspect of the invention, the backrest can in turn be mobile with respect to the cladding element, using second hinge means which enable the backrest to rotate about an axis parallel to the rotation axis of the seat.

This aspect has the advantage of configuring a very simple solution which enables the backrest to be displaced between the rest position thereof and the use position thereof.

Including first and second hinge means, independent of one another, further means that the seat and the backrest can rotate with respect to one another, for example so as to pass from the open configuration to the closed configuration as delineated in the foregoing.

In a further aspect of this solution, the first and the second hinge means can be configured so that the rotation axis of the backrest coincides with the rotation axis of the seat.

In this way it is advantageously possible to obtain a further structural simplification of the device and a further reduction of the overall encumbrances.

BRIEF DESCRIPTION OF THE DRAWINGS

Further characteristics and advantages of the invention will emerge from a reading of the following description, provided by way of non-limiting example, with the aid of the figures illustrated in the accompanying tables of drawings.

FIGS. 8 and 9 very schematically show a seat according to a variant of the present invention in two different configurations.

DETAILED DESCRIPTION OF THE PREFERRED EMBODIMENTS

The agricultural tractor (not shown in its entirety in the accompanying figures) is an agricultural work vehicle that generally comprises two pairs of wheels arranged respectively on a front axle and a rear axle, an internal combustion engine positioned inside an engine compartment placed at the front of the tractor, substantially between the wheels of the front axle, and a transmission system able to transfer the mechanical power generated by the engine to the wheels.

Figure 1:
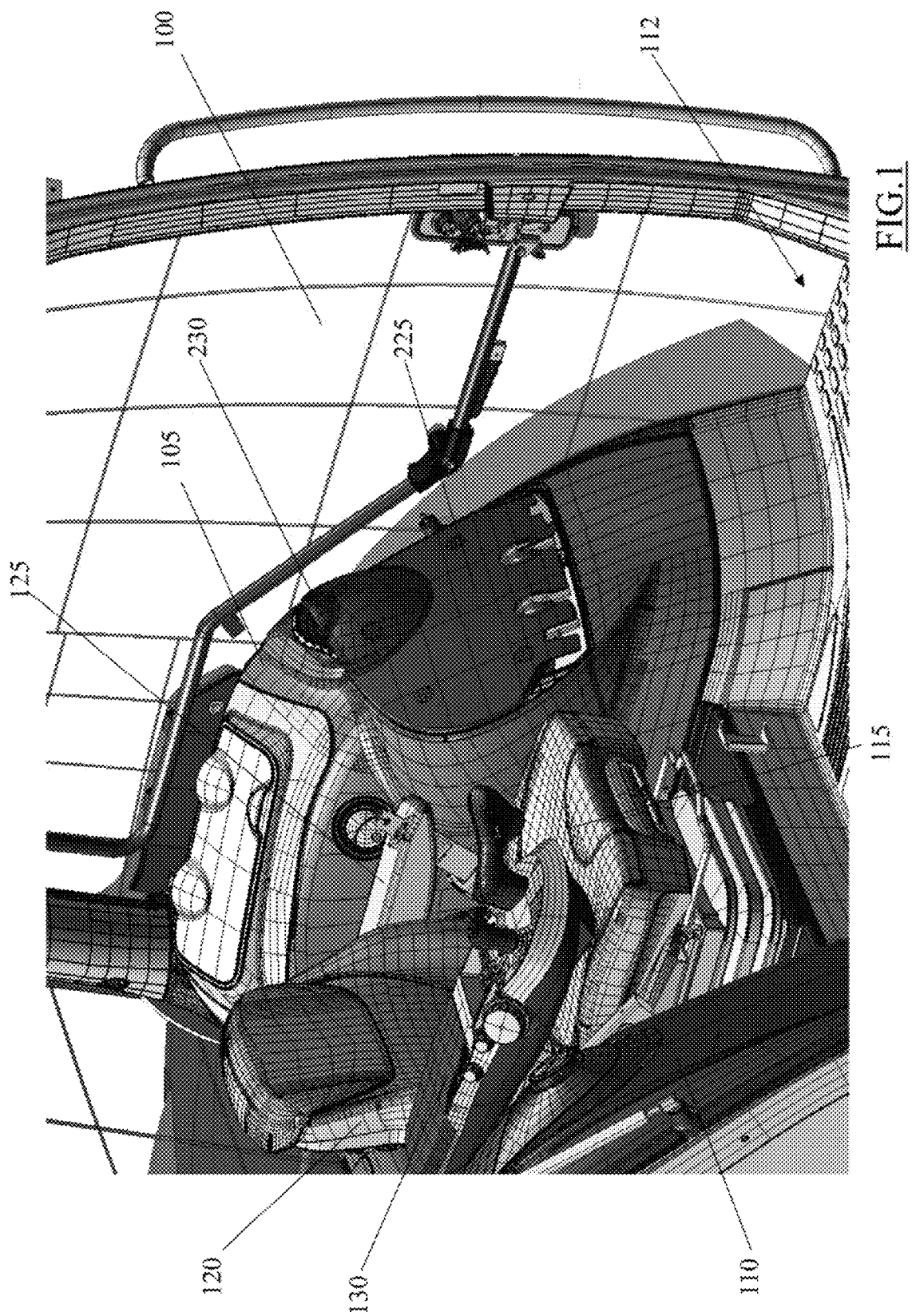
FIG. 1 is a perspective view of the interior of the passenger compartment of an agricultural tractor equipped with a seat for a passenger, a seat and backrest of which are shown in the rest position.

The agricultural tractor further comprises a passenger cabin for the driver and for an eventual passenger, which is generally located behind the engine compartment, positioned substantially between the wheels of the rear axle. As illustrated in FIG. 1, the interior of the agricultural tractor can be realized in the form of a true and proper cabin, which comprises a cover (not visible) and a series of transparent side panels 100 which allow the driver a complete view of the surrounding environment. These transparent side panels generally include a front windshield, a rear window and two flanks, at least one of which is openable to enable ascent and descent of the driver and an eventual passenger. In other, more economic, embodiments, the cabin of the agricultural tractor could, however, be partially or fully open, i.e. without the panels 100 and possibly also without covers.

The internal space of the cabin is also delimited by a series of cladding elements borrowed from the automobile sector, adapted to cover the visible parts of the body or other mechanical structures of the agricultural tractor, in order to improve the aesthetic appeal of the cabin and the driver's comfort. These cladding elements are generally suitably-shaped casings that can be made of a plastic material, for example via a hot-forming process, and then advantageously fixed to the inside of the cabin so as to cover the various parts to be clad.

The cladding elements can include a front dashboard (not visible) able to cover the part of the body that separates the passenger compartment from the engine compartment, and two lateral panels 105 and 110 of substantially arcuate shape, which are individually adapted to cover a respective wheel arch, in collaboration with an external mudguard. A front portion of the lateral panel 105 is separate and distanced from the front dashboard, in such a way as to create a narrow access corridor 112 enabling the driver to access and exit the cabin.

Various command organs of the agricultural tractor can be installed on the front dashboard and the lateral panels 105 and 110. For example, the driving controls, such as the steering wheel and the pedals, are normally installed on the front dashboard.

A driver seat 115 is located internally of the cabin, which seat is positioned between the two lateral panels 105 and 110 and faces towards the front dashboard. In the illustrated example, the driver seat 115 is conformed as a chair provided with a backrest 120 and two lateral arms, of which a left arm 125, made simply for resting an arm, and a right arm 130 for control of the vehicle, which has larger dimensions and in which various controls of the agricultural tractor can be integrated.

Figure 2:
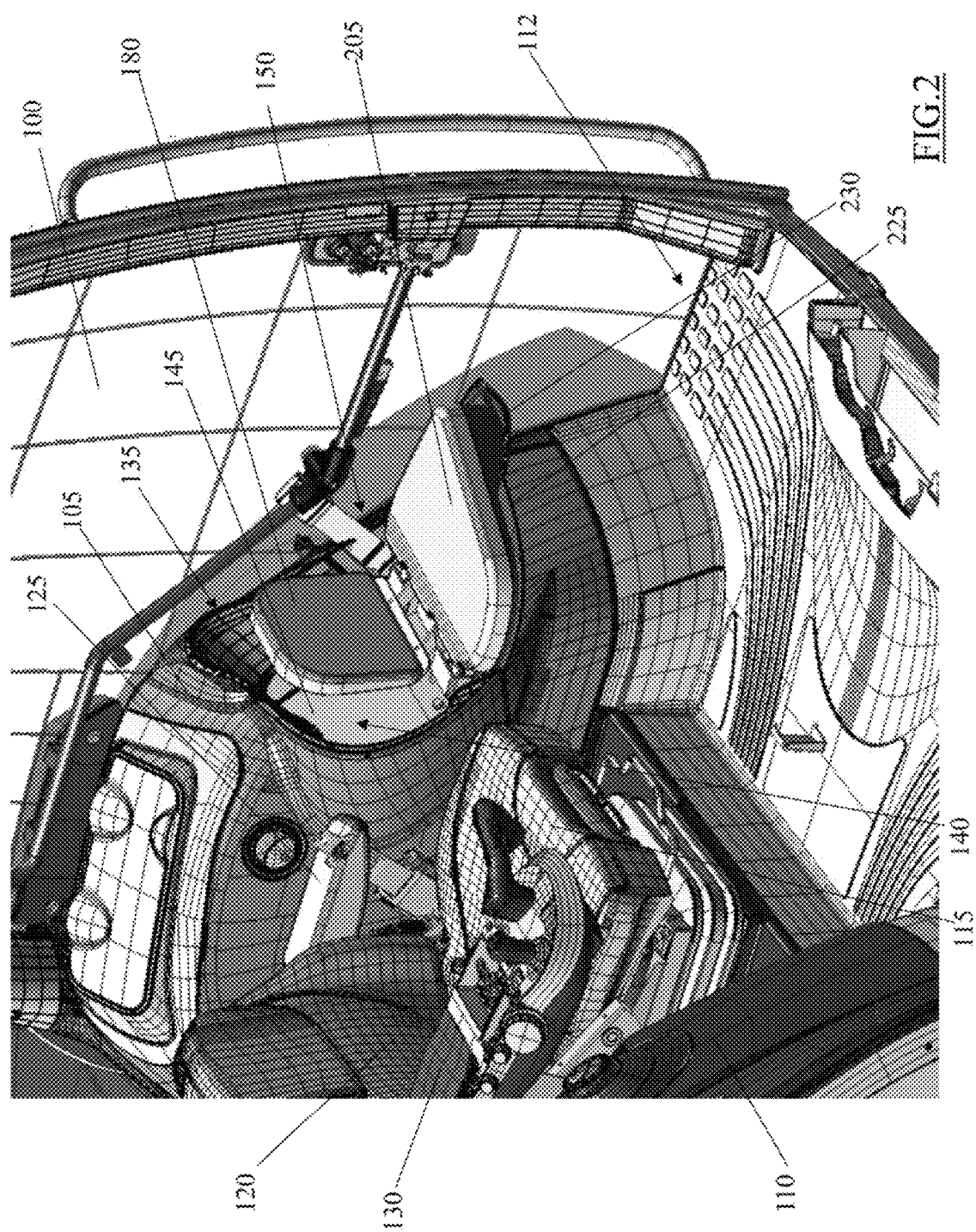
FIG. 2 is the view of FIG. 1 in which the seat and backrest of the seat for the passenger are shown in the use position.

As illustrated in FIG. 2, the front wall of the lateral panel 105 facing the access corridor 112 affords a front opening 135, which places the interior space of the passenger in communication with a hidden compartment 140, a volume of which is contained within the volume of the lateral panel 105.

In particular, this compartment 140 is posteriorly and laterally delimited by a bin 145, which branches from an edge of the front opening 135 of the lateral panel 105, in such a way that the concavity thereof is turned towards an inside of the cabin. In the illustrated example, the bin 145 is realized as a separate body with respect to the lateral panel 105, for example is made of a plastic material by means of a further hot-forming process, which separate body is inserted into the front opening 135 and is fixed along the edge of the front opening using a heat-welding process, gluing or any other known system. In other embodiments, the bin 145 could however be formed in a single body with the lateral panel 105, for example using the same plastic material and by means of a single hot-forming process. In this case, the edge of the bin 145 would in fact also define the front opening 135 of the lateral panel 105.

A small auxiliary seat is housed in the compartment 140, which auxiliary seat is denoted in its entirety by reference number 150 in FIG. 2; the auxiliary chair 150 is intended for use by a passenger needing to be transported on-board the cabin of the agricultural tractor.

Figure 3:
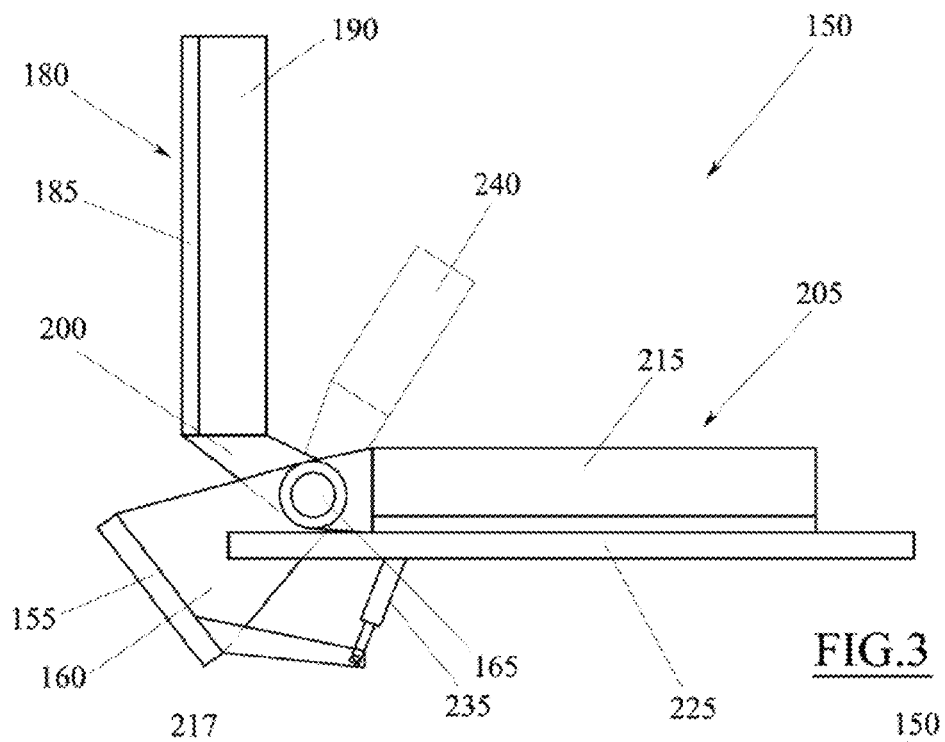
FIG. 3 is a schematic lateral view of the passenger seat of FIG. 2 de-assembled from the agricultural tractor.
Figure 4:
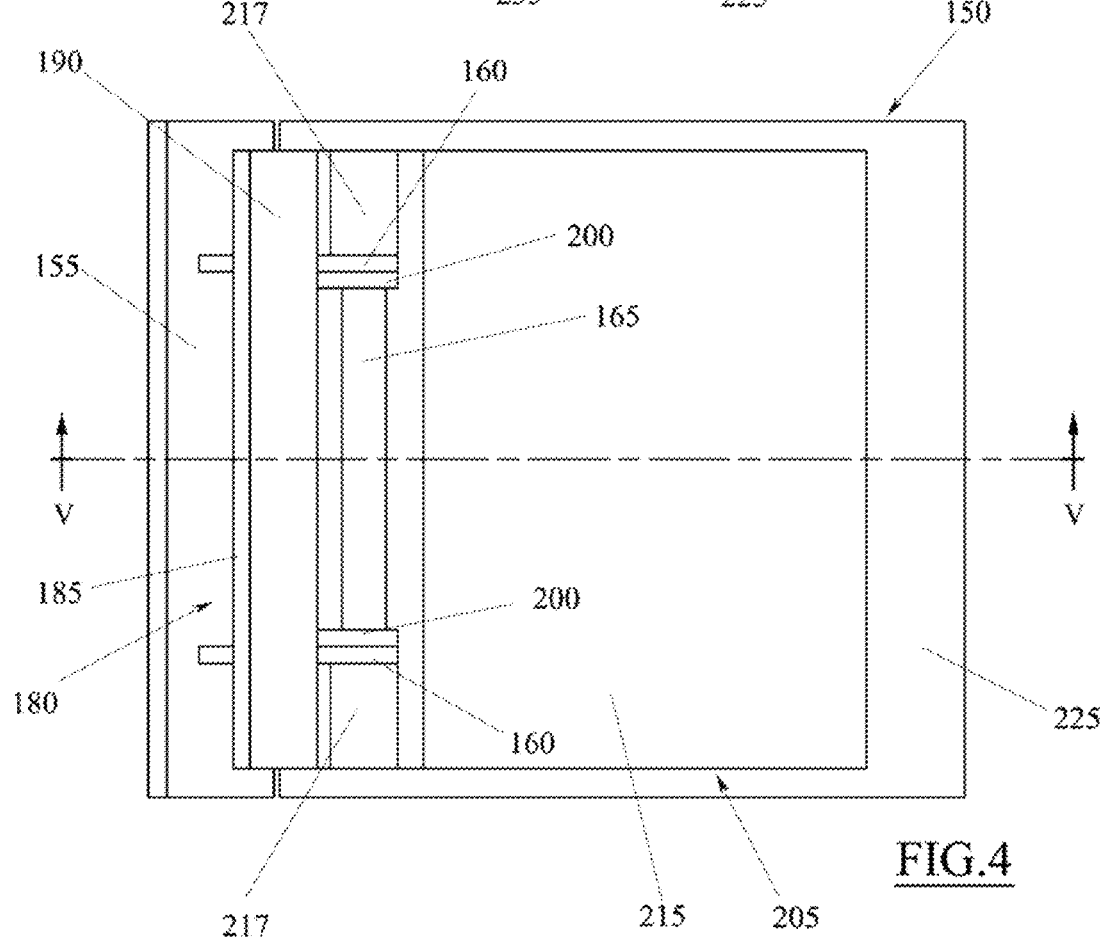
FIG. 4 is a plan view of the seat of FIG. 3.

As illustrated in FIGS. 3 and 4, the chair 150 primarily comprises a first connecting plate 155 intended to be fixed on the rear wall or bottom of the bin 145, for example by means of a series of bolts that can possibly also fasten on a rear wheel-well (see FIGS. 5-8). Two profiled plates 160 branch from the connecting plate 155, which plates 160 are vertically-orientated, mutually facing, and separated by a certain distance. The connecting plate 155 and the profiled plates 160 are preferably made of a metal material and are solidly constrained to one another, for example by welding, so as to form an overall single rigid element.

The end portion of each profiled plate 160 exhibits a through-hole (not visible), which is aligned with the through-hole afforded in the end portion of the other profiled plate 160. These two mutually aligned through-holes are able to receive a hinge pin 165, which is distanced from the connecting plate 155 and is perpendicular to the profiled plates 160, so as to be horizontally orientated.

The chair 150 further comprises a backrest, denoted in its entirety by 180. As illustrated for example in FIGS. 3 and 4, the backrest 180 comprises a support plate 185, which is orientated parallel to the hinge pin 165 and is covered with a layer of soft material 190. Two profiled plates 200 are fixed to a lower edge of the support plate 185, which profiled plates 200 are orientated perpendicular to the hinge pin 165, face each other and are separated by a distance of less than a distance separating the profiled plates 160 of the connecting plate 155. The support plate 185 and the profiled plates 200 are preferably made of a metal material and are solidly constrained to one another, for example by welding, so as to form a single rigid element.

Figure 5:
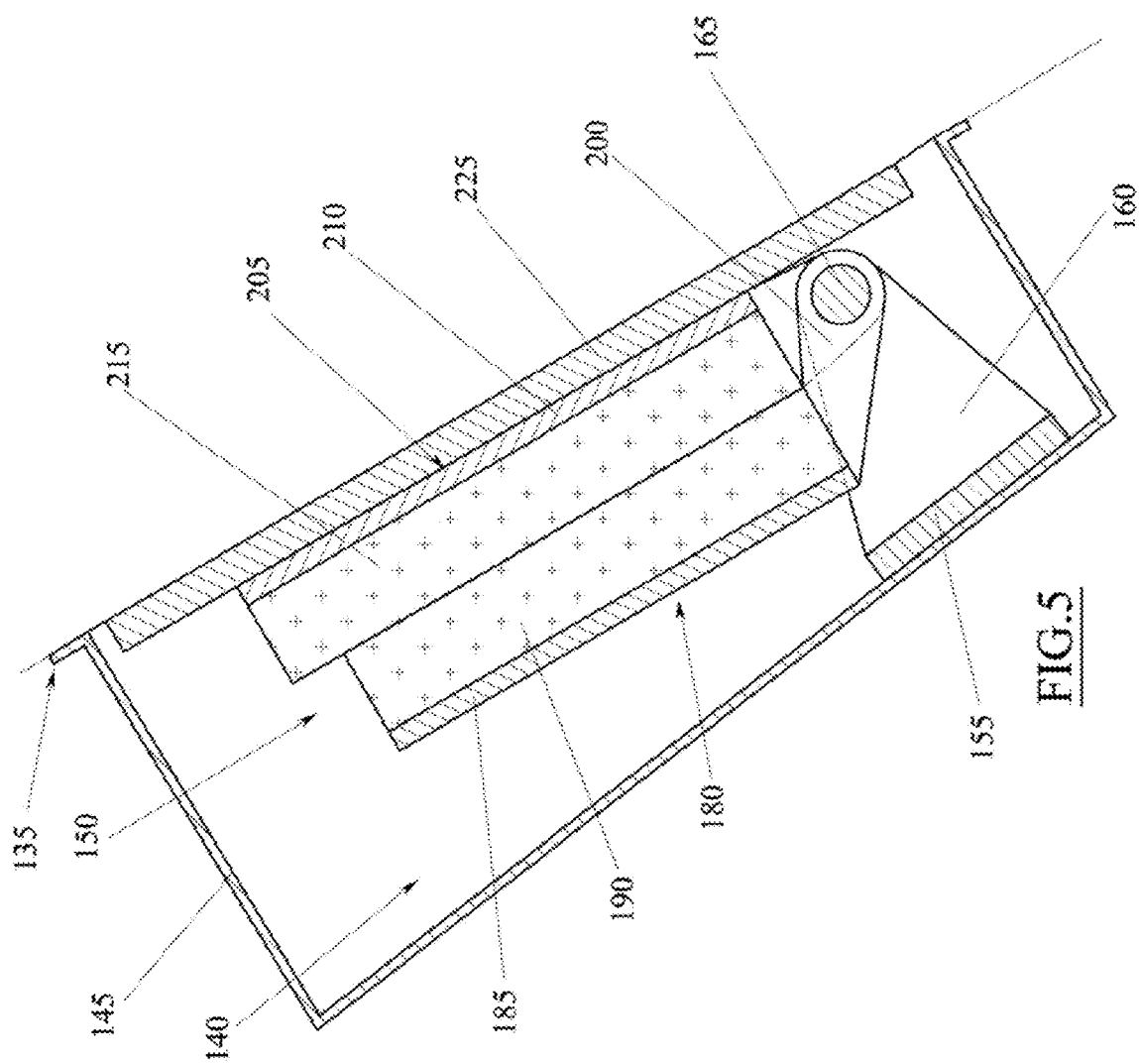
FIGS. 5, 6 and 7 schematically show the seat for the passenger of FIG. 2 sectioned according to plane V-V indicated in FIG. 4, and in three different positions.
Figure 7:
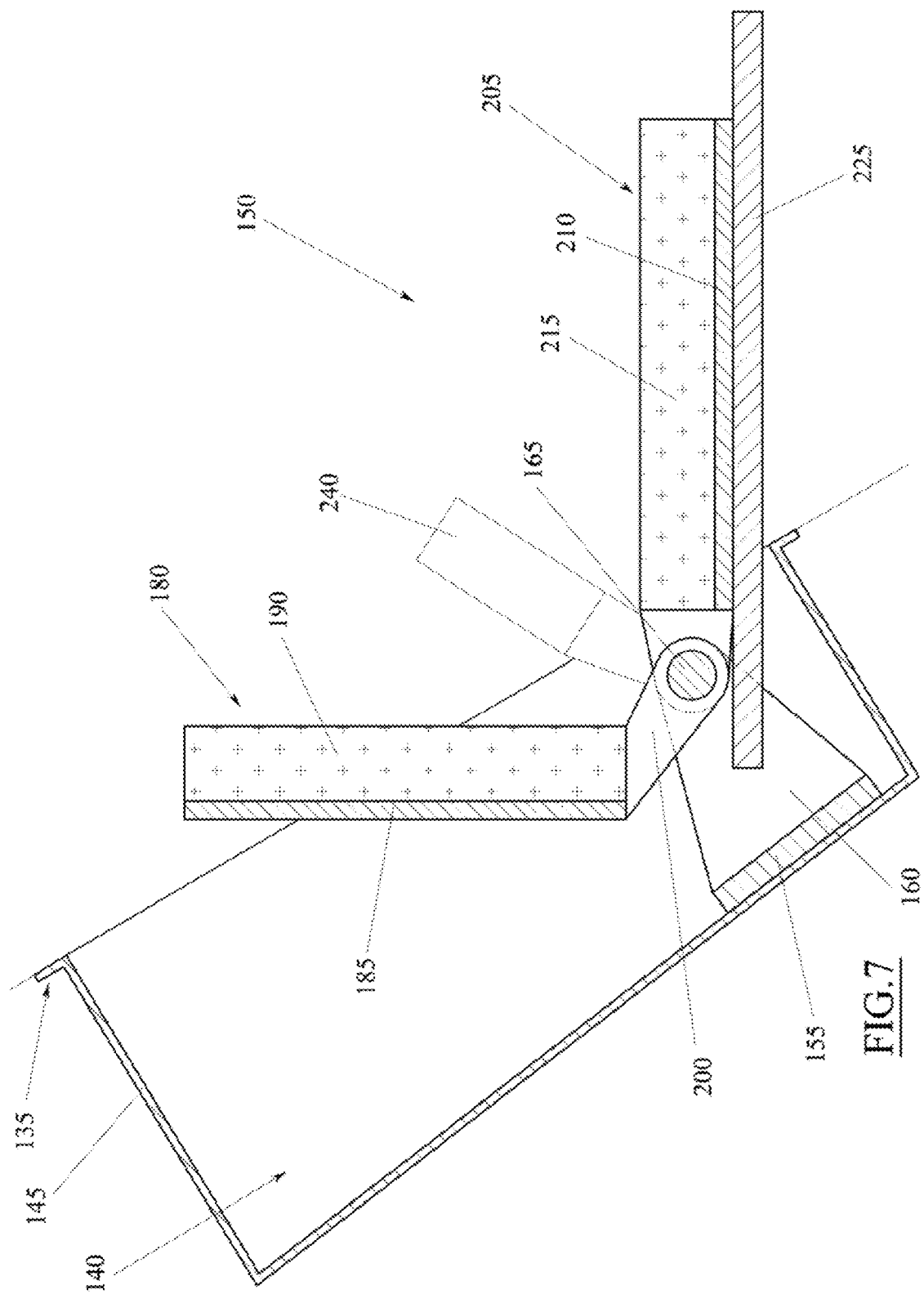

The profiled plates 200 of the backrest 180 are accommodated between the profiled plates 160 of the connecting plate 155 and exhibit through-holes (not visible), by means of which they are rotatably coupled to the hinge pin 165, so as to define a pair of hinges that enable the backrest 180 to rotate with respect to the connecting plate 155, between the rest position shown in FIG. 5 and the use position shown in FIGS. 7 and 2.

In the rest position, the backrest 180 is completely contained internally of the compartment 140, with the support plate 185 orientated substantially parallel to the connecting plate 155. In the use position, the backrest 180 partially projects inside the vehicle through the front opening 135 of the lateral panel 105, and is orientated substantially vertically or possibly slightly inclined. The rotation of the backrest 180 can be limited between the rest and use positions of by means of suitable limit switches.

The chair 150 also includes a seat, denoted in its entirety by 205. As illustrated in FIGS. 3 and 4, the seat 205 also comprises a support plate 210, which is orientated parallel to the hinge pin 165 and is covered with a pad of soft material 215. Two bushings 217 are fixed to a rear edge of the support plate 210, which two bushings 217 are mutually coaxially arranged and are separated by a distance greater than a distance separating the profiled plates 160 of the connecting plate 155. The support plate 210 and bushings 217 are preferably made of a metal material and are solidly constrained to one another, for example by welding, so as to form a single rigid element.

The bushings 217 are positioned in such a way as to embrace the profiled plates 160 of the connecting plate 155 and are rotatably threaded on the hinge pin 165, so as to define a pair of hinges enabling the seat 205 to rotate with respect both to the connecting plate 155 and to the backrest 180.

In particular, the seat 205 can rotate with respect to the connection plate 155 between the rest position shown in FIG. 5 and the use position shown in FIG. 7.

In the rest position, the seat 205 is completely contained internally of the compartment 140, with the supporting plate 210 orientated substantially parallel to the connecting plate 155. In the use position, the seat 205 projects almost completely internally of the vehicle through the front opening 135 of the lateral panel 105, and is orientated substantially horizontally. The rotation of the seat 205 can be limited between the rest and use positions by means of suitable end-run devices.

Figure 6:
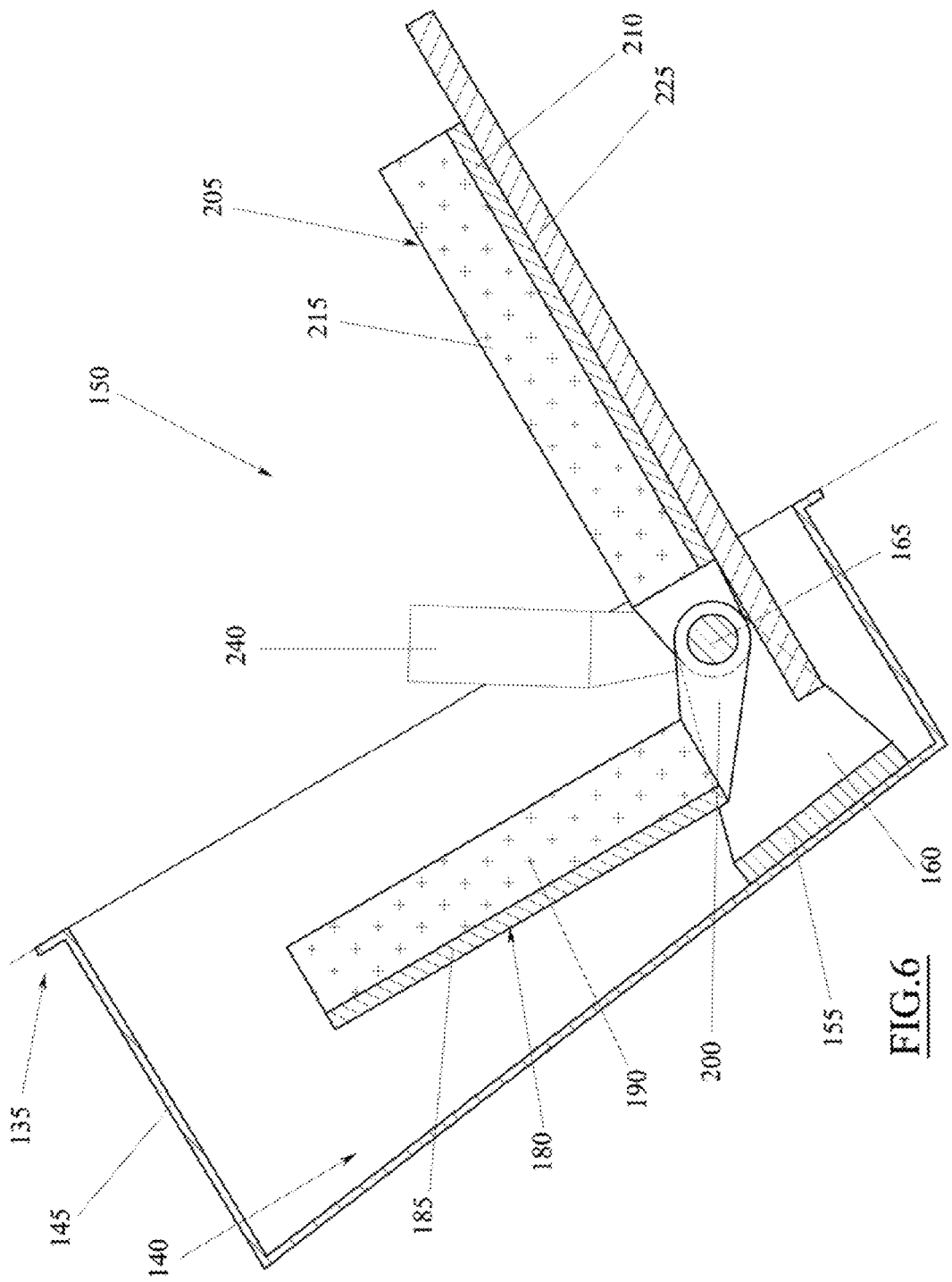

As mentioned herein above, the seat 205 can also rotate relative to the backrest 180 between the closed configuration shown in FIG. 5 and the open configuration shown in FIGS. 6 and 7.

In the closed configuration, the seat 205 is substantially parallel and superimposed on the backrest 180, with the respective paddings of soft material 215 and 190 practically in mutual contact, so as to minimize the overall dimensions of the chair 150. In the open configuration, the seat 205 is instead orientated substantially at right angles relative to the backrest 180, so as to enable use of the chair 150. The rotation of the seat 205 relative to the backrest 180 between the rest and use positions can be limited by means of suitable end-run devices.

With the above-described specifications, when the backrest 180 and the seat 205 are both in the rest position, the chair 150 is in the closed configuration and is completely contained within the compartment 140, as illustrated in FIG. 5. Starting from the initial configuration, the seat 205 can be manually rotated towards the use position thereof. During the rotation, the backrest 180 remains stationary until the seat 205 is perpendicular thereto as shown in FIG. 6. From this intermediate configuration, by continuing to rotate the seat 205 towards the use position, a simultaneous forward rotation of the backrest 180 also takes place. This movement stops when the seat 205 and the backrest 180 simultaneously reach the respective use positions, in which the chair 150 is in the open configuration and projects internally of the vehicle so that it can be used, as shown in FIGS. 7 and 2. The chair 150 can then, obviously, be returned from this configuration into the initial configuration by simply being rotated in the opposite direction, up until the seat 205 and the backrest 180 have both returned into the relative rest positions, in which they are completely contained inside the lateral panel 105.

With this solution, when the chair 150 is housed in the compartment 140 the available space in the passenger compartment is advantageously increased, as is also the safety aspect, since the seat does not clutter the access corridor 112 in an emergency.

As illustrated in all the figures, a lid 225 is also associated to the chair 150, which lid 225 is fixed to the lower face of the support plate 210 of the seat 205, opposite the pad of soft material 215, and is shaped so as to completely or almost completely close the front opening 135 of the side panel 105, when both the seat 205 and the backrest 180 are in the rest position, so as to hide the seat 205 and backrest 180 inside the compartment 140 (see FIGS. 1 and 5). The lid 225 can be profiled so as to provide a handle 230 (only visible in FIGS. 1 and 2) that can be grasped by a user to bring the seat 205 and the backrest into the use position when required. The lid 225 can be made of a plastic material, for example by means of a hot-forming process, and then be fixed to the support plate 210 of the seat 205 by means of any system of known type.

As illustrated in FIG. 3, the chair 150 also includes an elastically-acting element, in the present case a gas spring 235, ends of which are hinged respectively to the connecting plate 155 and the support plate 210 of the seat 205, so as to be also completely contained internally of the compartment 140 of the lateral panel 105 when the seat 205 is in the non-use position. In particular, the hinge points of the gas spring 235 are chosen so that the spring 235 will push the seat 205 (and thus indirectly also the backrest 180) biasedly into the rest position thereof. In this way, in the rest position the seat 205 will be prevented from vibrating, as the lid 225 will strike against the lateral panel 105 following jolts to which the agricultural tractor will be subjected, for example during normal use thereof in fields.

Lastly, the chair 150 is equipped with a conventional safety belt for the passenger sitting on the seat 205. The safety belt (of which only the engagement socket 240 is visible in the figures) is generally fixed to the connecting plate 155 so as also to remain enclosed within the compartment 140 of the lateral panel 105 when the seat 205 is in the rest position.

In conclusion, it is specified that in a further embodiment, the chair 150 can also comprise means for regulating the height of the backrest 180 relative to the seat 205 when both are in the use position, so that the chair is made more comfortable and ergonomic. For example, the pad of soft material 215 could be fixed to an auxiliary plate, which might in turn be fixed on the support plate 210 so as to be able to slide on it upwards and downwards when the backrest 180 is in the use position. Alternatively, as illustrated in FIGS. 8 and 9, the backrest 180 might include an upper portion 182, able to slide vertically relative to a lower portion of the backrest 180, when the backrest 180 is in the use position.

Obviously a technical expert of the sector might make numerous modifications of a technical-nature to the invention as described in the foregoing, without forsaking the scope of the invention as claimed in the following.

The invention claimed is:

1. An agricultural tractor comprising a cabin and at least a cladding element (105) for delimiting an internal space of the cabin, the cladding element (105) comprising an opening (135) able to place the internal space of the cabin in communication with a compartment (140) in which at least a support frame (150) for a seat (205) is housed, the seat (205) being coupled to the support frame (155, 160) by means of first hinge means (165, 217) which are completely located inside the compartment (140) and enable the seat (205) to rotate about a substantially horizontal axis between a rest position in which the seat (205) is completely contained in the compartment (140), and a use position, in which the seat (205) is orientated horizontally and at least partly projects into an internal space of the cabin, a backrest (180) for the seat (205) being also coupled, separately from the seat (205), to the support frame (150) by means of second hinge means (165, 200) which enable the backrest to rotate about an axis that is parallel to the rotation axis of the seat (205) between a rest position, in which the seat (205) is completely contained in the compartment (140), and a use position, in which the seat (205) is vertically orientated and at least partially projects into the internal space of the cabin.

2. The tractor of claim 1, wherein a lid (225) is fixed to the seat (205), said lid (225) is able to close the opening (135) of the cladding element (105) when the seat (205) is in the rest position.

3. The tractor of claim 1, wherein the compartment (140) is delimited by a bin (145) which branches from the opening (135) of the cladding element (105).

4. The tractor of claim 1, further comprising at least an elastically yielding element (235) able to push the seat (205) towards the rest position.

5. The tractor of claim 1, wherein the seat (205) and the backrest (180) are reciprocally mobile between a closed configuration, in which they are substantially parallel and superposed, and an open configuration, in which they are arranged substantially at a right angle.

6. The vehicle of claim 1, wherein the backrest (180) comprises an upper portion (182) which is coupled to slide vertically with respect to a lower portion of backrest (180) when both the backrest (180) and the seat (205) are in use position.

7. The tractor of claim 1, wherein the first and the second hinge means are configured such that the rotation axis of the backrest (180) coincides with the rotation axis of the seat (205).

* * * * *